United States Patent [19]

Yano et al.

[11] Patent Number: 5,064,452
[45] Date of Patent: Nov. 12, 1991

[54] GAS REMOVABLE PUMP FOR LIQUID

[75] Inventors: Hisashi Yano, Yokohama; Junsuke Yabumoto, Atsugi; Akiharu Kitada, Kawasaki, all of Japan

[73] Assignee: Mitsubishi Oil Co., Ltd., Tokyo, Japan

[21] Appl. No.: 627,055

[22] Filed: Dec. 13, 1990

[30] Foreign Application Priority Data

Dec. 15, 1989 [JP] Japan .................. 1-323843

[51] Int. Cl.$^5$ ............................................ B01D 19/00
[52] U.S. Cl. .................. 55/203; 418/DIG. 1; 418/87; 418/94; 415/169.1
[58] Field of Search .................. 415/169.1, 169.2; 55/203; 418/DIG.1, 87, 94

[56] References Cited

U.S. PATENT DOCUMENTS

| | | | |
|---|---|---|---|
| 3,290,864 | 12/1966 | Harker et al. | 55/203 |
| 4,676,810 | 6/1987 | El Saie et al. | 55/203 |
| 4,799,940 | 1/1989 | Millikan | 55/203 |

Primary Examiner—Bernard Nozick
Attorney, Agent, or Firm—Locke Reynolds

[57] ABSTRACT

A gas removable pump for liquid comprising a housing having an inlet for introducing the liquid thereinto and an outlet for feeding the liquid therefrom, a drive shaft extending into the housing and a rotary pump disposed within the housing, the rotary pump including a rotor secured to the drive shaft for co-rotation therewith and a plurality of cells for feeding the liquid, each cell constituting a separator for gas-rich liquid upon rotation of the rotor. An ejector is provided for ejecting the gas-rich liquid separated in each cell through a passage formed in the drive shaft and the rotor. Also provided is a valve in the passage for opening and closing the same, the valve being arranged to operate in response to a pressure in the cell. The gas rich liquid gathers at inner portion of the cell due to a centrifugal force and is discharged by means of the ejector through the passage when the valve is in an open position.

29 Claims, 3 Drawing Sheets

GAS REMOVABLE PUMP FOR LIQUID

BACKGROUND OF THE INVENTION

1. Field of the Invention

The present invention generally relates to a pump for feeding a liquid and, more particularly, to a pump having a gas removal function for removing gaseous contaminants contained in the liquid to thereby feed the liquid containing little gaseous contaminants.

2. Description of the Prior Art

In various fields of industry, a requirement exists to remove gaseous contaminants contained in a liquid which are fed by a pump. One example can be found in a chemical industry where raw materials, intermediate products or final products in the form of liquid are fed by the pump to be processed and/or stored. These liquid materials and products often contain gaseous contaminants which cause problems during feeding, processing and at the final products and should therefore be removed. Also, various lubricating oils tend to contain gaseous contaminants during use, examples thereof including oils for use in engine, gear, automatic transmission, torque converter, power steering, hydraulic actuator, turbine, compressor, quenching, rolling, metal working and traction device. Such gaseous contaminants adversely affect the lubrication and hydraulic properties and are desired to be removed.

There has been a known technique which utilizes a buoyancy of gases for removing the contaminants from the liquid. Another approach has resulted in a use of centrifugal force generated by a vortex flow of the liquid as disclosed in, for example, Japanese Patent Publications Nos. 44-23803 and 61-36444 and Japanese Patent Laid-Open No. 1-104315. Due to a difference in density, the gas-rich liquid having a smaller specific gravity gathers in an area around a center of the vortex flow and the liquid containing little gaseous contaminants is separated to gather in a peripheral area.

However, all of the known gas removal devices are provided separately from a pump for feeding the liquid, and nothing has hitherto been proposed toward an integration of the pump and gas removal device. To install the pump and gas removal device in different portions of feed pipes of a chemical plant or lubricating system necessarily involves not only an increased work but also an increased space for the assembly and is therefore undesirable. This is particularly important when only a limited space is available for installation, such as in an automobile engine and an automatic transmission where miniaturization is one of the essential requirements in a design.

SUMMARY OF THE INVENTION

Accordingly, an object of the invention is to provide an integrated gas removable pump which can efficiently separate gaseous contaminants from a liquid to be pumped, without a need of additional energy other than required for rotating the pump.

Another object of the invention is to provide a gas removable pump for liquid which may easily be installed in a relatively small space.

According to the present invention, a gas removable pump for liquid comprises a housing having an inlet for introducing the liquid thereinto and an outlet for feeding the liquid therefrom, a drive shaft extending into the housing and a rotary pump disposed within the housing, the rotary pump including a rotor secured to the drive shaft for co-rotation therewith and a plurality of cells for feeding the liquid, each cell constituting a separator for gas-rich liquid upon rotation of the rotor. An ejecting means is provided for ejecting the gas-rich liquid separated in the cells through a passage means formed in the drive shaft and the rotor. The pump further includes a valve means provided in the passage means for opening and closing the passage means, the valve means being operable in response to a pressure in each cell.

In a preferred embodiment of the invention, the passage means comprises a removal passage formed in the drive shaft to extend along the axis thereof and a plurality of radial passage means for connecting each cell with the removal passage, and the valve means is provided in each radial passage means. The valve means may comprise a valve body having a through hole aligned with the radial passage means in an open position of the valve body, and means for moving the valve body in response to the pressure in the cell. The valve body moving means preferably includes urge means for urging by a centrifugal force acting thereon the valve body toward a closed position thereof.

Other objects, features and advantages of the present invention will be apparent from the following description of the preferred embodiments thereof when taken in conjunction with the accompanying drawings.

DESCRIPTION OF THE PREFERRED EMBODIMENTS

Figure 1:
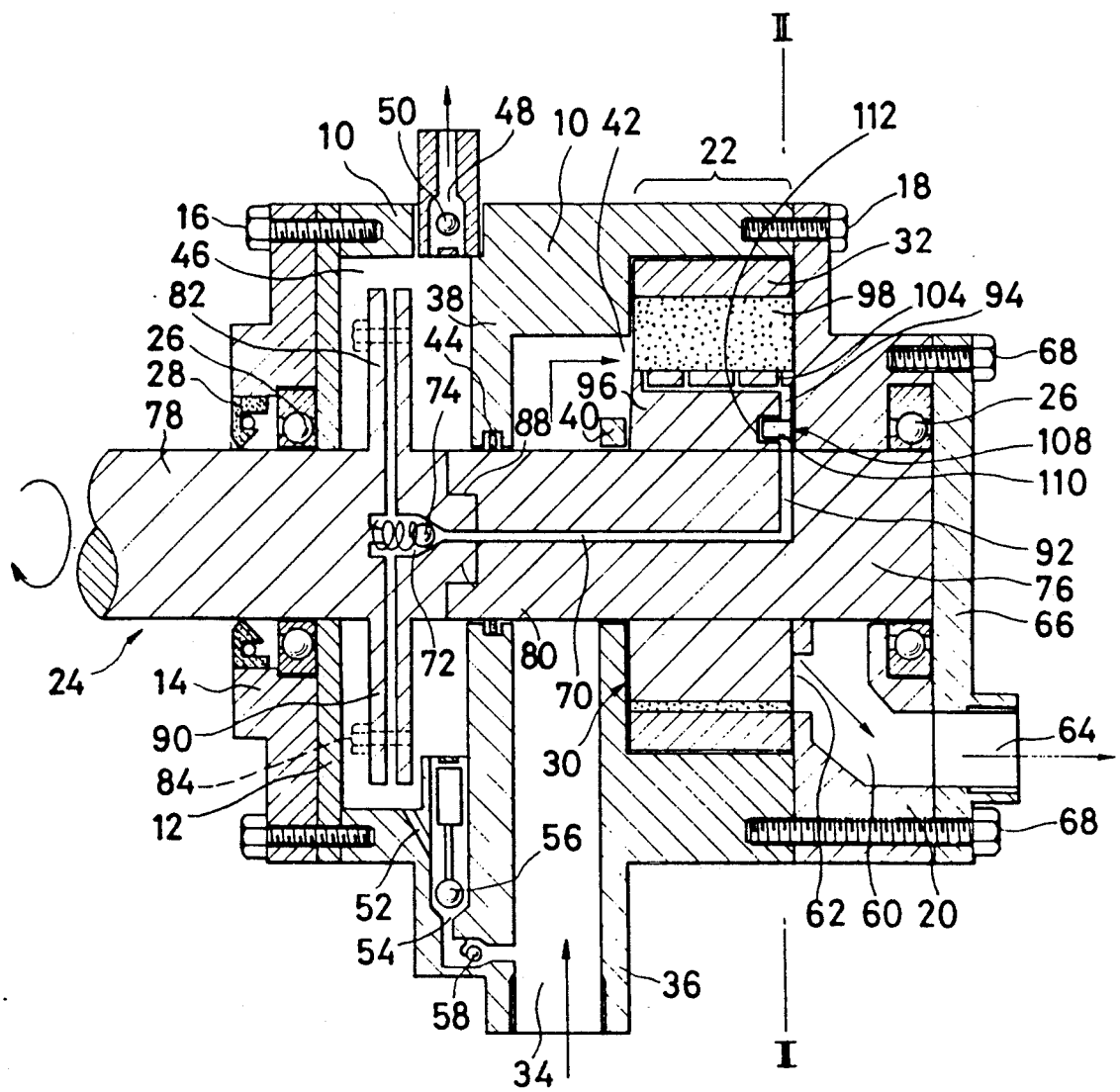
FIG. 1 is a longitudinally sectioned schematic view illustrating a gas removable pump for liquid according to an embodiment of the invention.

Referring to FIG. 1 of the drawings, a gas removable pump for liquid according to a preferred embodiment of the present invention has a generally cylindrical housing 10 having opposite open ends, one of the ends, i.e. the left-hand end in FIG. 1, being sealingly closed by a disk-shaped cover 12. A cap 14 rests on the axially outer surface of cover 12, and these cap and cover are fixed to the housing 10 by bolts 16. Fastened to the right-hand end of the housing by bolts 18 is a head cover 20 which defines a discharge opening for a rotary pump 22 as described below. A drive shaft 24 extends into the housing 10 along the axis thereof through the cap 14 and cover 12 and terminates at the end of head cover 20. The cap 14 and head cover 20 have recesses within which are received bearings 26 for supporting the shaft 24. A suitable seal 28 is provided around the shaft 24 at the outer end of cover 14. The rotary pump 22, which comprises a vane pump in the illustrated embodiment, is disposed in the housing 10 adjacent the right-hand end thereof. Specifically, the rotary pump comprises a rotor 30 coaxially attached to the shaft 24 for co-rotation therewith and a casing 32 secured to the inner surface of the housing in such a manner that the casing is eccentric relative to the shaft 24, as in the conventional rotary pump.

An inlet 34 is defined between a projection 36 and a partition wall 38 of the housing 10 to introduce a liquid such as an oil thereinto. A disk wall 40 extends radially inward at a position corresponding to the projection 36 for defining an intake opening 42 of the rotary pump 22.

The partition wall 38 has an O-ring 44 fitted around the shaft 24 and defines in cooperation with the cover 12 a discharging chamber 46 which is sealingly separated from the inlet 34 and communicates with the outside of the housing 10 through a hole 48 having a valve 50. A drain hole 52 is formed in the wall of housing 10 at a position opposite to the hole 48 to connect the chamber 46 with a return passage 54 which extends to the inlet 34. A float valve 56 and a check valve 58 are provided in the return passage 54 as in an usual drainage system.

The head cover 20 is formed with an outlet 60 extending between a discharge opening 62 of the pump 22 and an exit 64 in a cap 66 which is secured to the head cover 20 by bolts 68. The drive shaft 24 has formed therein along the axis thereof a removal passage 70 extending from the rotary pump 22 to the discharging chamber 46 where it terminates at an expanded end portion 72 for accommodating a check valve 74. In order to enable an assembly, the shaft 24 comprises a three-part structure comprising a main portion 76 that extends from the head cover 20 to the partition wall 38, a head portion 78 connected to, for example, a drive source (not shown) at one end and extending into the longitudinal center of discharging chamber 46, and an intermediate portion 80 between the main portion and head portion. Both of the head portion 78 and intermediate portion 80 have radially extending flanges 82 which face each other and are fastened together by means of bolts 84 after a check valve 86 is received in the expanded end 72 of removal passage 70. Thereafter, the intermediate portion 80 is joined to the main portion 76 at a spline 88. Formed in the coupled flanges 82 are a plurality of bores 90 extending from the periphery of flanges to the expanded end 72, thereby connecting the removal passage 70 with the discharging chamber 46.

The other end of removal passage 70 has a plurality of radial extensions 92 which communicate and are aligned with radial passages 94, respectively, in an annular body 96 of the rotor 30, each radial passage being defined by a groove formed in the outer surface of annular body and the inner surface of head cover 20. The rotor 30 includes a plurality of vanes 98 which are slidably received in holes 100 (FIG. 2) and are urged radially outward by elastic means (not shown) in the holes so that the outer ends thereof are always in contact with the inner surface of casing 32, defining cells 102a to 102h which vary their volume as the annular body rotates. Each of the cells 102 is connected with the corresponding radial passage 94 through orifices 104 having openings 106 adjacent the vane 98 of forward side in the rotational direction. In the illustrated example, four orifices 104 axially spaced from each other open into each cell 102.

A valve generally indicated by numeral 108 is disposed in each radial passage 104 and adapted to operate in response to a pressure in the cell 102 for the purpose of communicating the cell 102 with the removal passage 70 during a predetermined phase of rotation of the rotor 30. The illustrated valve 108 includes a cylindrical valve body 110 fitted in the groove to close the passage 94, one end surface of the valve body 110 being substantially in contact with the head cover 20 while the other end is received in a depression 112 at the bottom of the groove.

Figure 3:
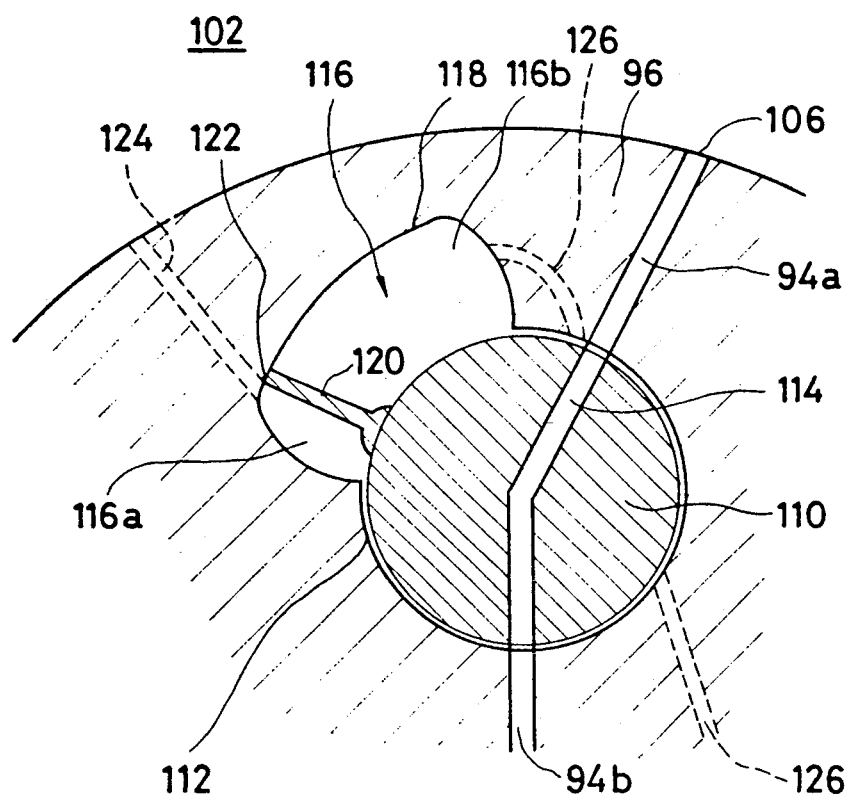
FIG. 3 is an enlarged sectinal view showing a valve.

As best shown in FIG. 3, an angled hole 114 is formed diametrically through the valve body 110 to connect the outer section 94a having the opening 106 of the passage 94 with the inner section 94b thereof extending to the radial extension 92. FIG. 3 shows an opening of the valve 108, in which the upper and lower halves of angled hole 114 are aligned with the outer and inner sections 94a and 94b, respectively. A pressure detecting chamber 116 is provided in the annular body 92 adjacent the depression 112 and is defined by a marginal wall 118 having a curvature equal to that of a virtual circle which is concentric with the valve body 110 and has a diameter twice a distance from the center thereof to the wall 118. A projection 120 of the valve body extends in the chamber 116 so that its edge 122 comes in contact with the wall 118 in a slidable manner, thereby sealingly dividing the chamber 116 into first and second sub-chambers 116a, 116b. This projection 120 is arranged in such a manner that during rotation of the annular body 96 a centrifugal force acting on the projection 120 urges the valve body 110 to turn in a clockwise direction in FIG. 3.

The first sub-chamber 116a communicates with the cell 102 through a passage 124 for maintaining a pressure therein at a level equal to that in the cell 102. Another passage 126 opens into the second sub-chamber 116b and extends via a suitable connection (not shown) to a portion near the discharge opening 62 in order to maintain a pressure in this sub-chamber 116b at a level substantially equal to a delivery pressure of the pump 22. It is to be noted here that the valve body 110 may be in the form of a ball if the valve is provided in the radial extension 92.

When the shaft 24 is rotated by the drive source to rotate the rotor 30, the liquid such as an oil containing gaseous contaminants flows from the inlet 34 into the cells 102 of the pump 22. The liquid in the rotating cell 102 is subjected to a centrifugal force, whereby the liquid containing gaseous contaminants, i.e. gas-rich liquid, having small density is separated and gathers near the outer surface of annular body 96. More particularly, the gas-rich liquid tends to gather in a portion adjacent the vane 98 of forward side in the rotating direction. The rotational movement of drive shaft 24 also creates a centrifugal force at the outer open ends of bores 90 so that a suction force is generated in the removal passage 70 to open the check valve 74. This suction force prevails over a similar force acting in the cell 102 because of the difference in diameters of the flanges 82 and the annular body 96. Accordingly, the gas-rich liquid around the annular body in each cell is sucked into the orifices 104 to be ejected in the discharging chamber 46 via the removal passage 70 and the bores 90 when the valve 108 in the radial passage 94 opens.

Figure 2:
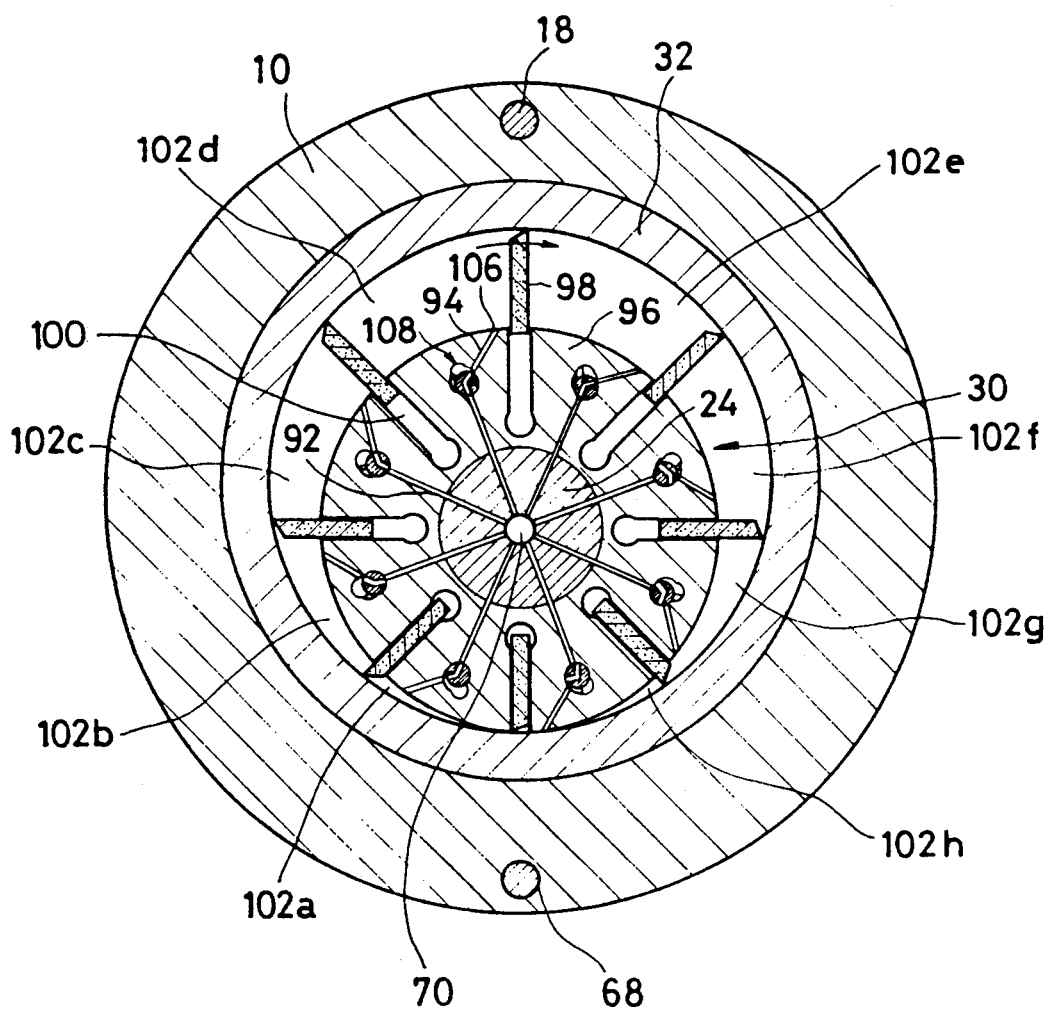
FIG. 2 is a cross sectional view taken along line -of FIG. 1.

In FIG. 2, volume of the cell increases from 102a to 102d to suck the liquid at 102d and/or 102c. Consequently, a pressure in the first sub-chambers 116a connected to these cells is negligible as compared with a pressure in the corresponding second sub-chambers 116b, so that the projections 120 are maintained in the position shown in FIG. 3 where the centrifugal force acting thereon equilibrium with the pressure in the second sub-chambers 116b. The valve 108 for each of these cells thus continues to open. Although a compression phase starts from the cell 102e, a pressure therein is still negligible and the valve 108 is kept open. At the cell 102f under the compression phase an increased pressure is introduced into the corresponding first sub-chamber 116a, and a total of this pressure and the centrifugal force applied to the projection 120 overcomes the pressure in the second sub-chamber 116b. Therefore, the projection 120 is caused to move so as to expand the first sub-chamber 116a while turning the valve body 110 in the clockwise direction in FIG. 3. This results in a closure of the valve 108 as the angled hole 114 is released from the alignment with the radial passage 94, the closed status continuing to the end of discharge phase at the cell 102h.

It will be thus understood that the gas-rich liquid is removed during the suction phase at cells 102c and/or 102d and in the beginning of the compression phase at cell 102e. This timing of valve opening/closing can be changed as desired by suitably modifying position, shape etc. of the projection and pressure detecting chamber. The valve may be set to open in either the suction or compression phase or both of these phases of the cells but slould not open during the discharging phase.

The gases are finally discharged outside of the housing 10 through the hole 48, while the liquid component in the ejected material collects on the bottom wall of the chamber 46 for drainage via the drain hole 52 to flow back into the inlet 34. On the other hand, the liquid containing little gaseous contaminants is forced out of the housing 10 via the discharge opening 62 by a delivery pressure of the pump 22, the liquid being fed through the outlet 60 and the exit 64.

As described above, the pump according to the invention enables to efficiently remove gaseous contaminants from the liquid to be pumped and therefore unnecessitates providing a gas removing device separately from the pump. Consequently, it becomes possible to save an installation space which is very valuable for miniaturizing an entire device, such as an automobile engine, in connection with which the present pump is to be used. Further, assembly work of such entire device can be reduced because of the integrated structure of the present pump. Still further, the gas removal function is achieved by using the rotational movement of drive shaft of the rotary pump, and no additional energy is thus required.

Although the present invention has been described with reference to its preferred embodiments, many modifications and alterations may be made within the spirits of the invention. Particularly, it should be understood that an application of the invention is not limited to the vane pump as described herein, and it is also applicable to other types of rotary pump having a rotor and cells. Further, various structures may be employed for the valve operable in response to the pressure in the cell. For example, a valve body in the form of a slidable bar having a through-hole can be fitted in a chamber to define a pair of sub-chambers at opposite sides of the bar, one of them being connected with the cell.

What is claimed is:

1. A gas removable pump for liquid comprising:
   a housing having an inlet for introducing the liquid thereinto and an outlet for feeding the liquid therefrom;
   a drive shaft extending into said housing;
   a rotary pump disposed within said housing, said rotary pump including a rotor secured to said drive shaft for co-rotation therewith and including vanes defining a plurality of cells with the housing for feeding the liquid, each said cell constituting a separator for gas-rich liquid from liquid upon rotation of said rotor;
   ejecting means for ejecting the gas-rich liquid separated in said cells;
   passage means formed in said drive shaft and said rotor for connecting said cells with said ejecting means; and
   valve means provided in said passage means for opening and closing said passage means, said valve means being operable in response to a pressure in each said cell and means for removing gas from the gas rich liquid and the housing.

2. A gas removable pump for liquid as claimed in claim 1, wherein said passage means comprises a removal passage formed in said drive shaft to extend along the axis thereof, and a plurality of radial passage means for connecting each said cell with said removal passage.

3. A gas removable pump for liquid as claimed in claim 2, wherein said drive shaft has a larger-diametered portion sealingly separated from said inlet of said housing, and wherein said passage means further includes a bore formed through said larger-diametered portion from the periphery thereof to said removal passage.

4. A gas removable pump for liquid as claimed in claim 3, wherein said ejecting means comprises the outer end of said bore whereby the rotation of said drive shaft generates a suction force at said removal passage.

5. A gas removable pump for liquid as claimed in claim 4, further comprising a check valve disposed in said removal passage at a point adjacent said bore for preventing a reverse flow of the gas-rich liquid.

6. A gas removable pump for liquid as claimed in claim 4, further comprising a discharging chamber defined in said housing, and wherein said larger-diametered portion of said drive shaft is accommodated in said discharging chamber to eject the gas-rich liquid thereinto.

7. A gas removable pump for liquid as claimed in claim 6, wherein the wall of said housing defining said discharging chamber has formed therein a hole for discharging the gases outside of said housing and a drain hole for drainage of liquid component.

8. A gas removable pump for liquid as claimed in claim 7, further comprising a return passage connecting said drain hole with said inlet of said housing.

9. A gas removable pump for liquid as claimed in claim 8, further comprising a check valve and a float valve disposed in said return passage.

10. A gas removable pump for liquid as claimed in claim 6, wherein said drive shaft comprises first, second and third sections joined together.

11. A gas removable pump for liquid as claimed in claim 10, wherein said rotor secured on said first section and said larger-diametered portion comprises a pair of facing flanges formed at the ends of said second and third sections.

12. A gas removable pump for liquid as claimed in claim 11, wherein said first and second sections are joined together by spline while said second and third sections are joined by fastening said flanges together.

13. A gas removable pump for liquid as claimed in claim 2, wherein said valve means is provided in each said radial passage means.

14. A gas removable pump for liquid as claimed in claim 13, wherein said valve means includes a valve body having a through hole aligned with said radial passage means in an open position of said valve body, and means for moving said valve body in response to the pressure in said cell.

15. A gas removable pump for liquid as claimed in claim 14, wherein said rotary pump further includes a casing secured to the inner surface of said housing eccentrically relative to said drive shaft.

16. A gas removable pump for liquid as claimed in claim 15, wherein said rotor of said rotary pump comprises an annular body around said drive shaft and a plurality of vanes supported by said annular body and urged radially outward to be in contact at the outer ends thereof with the inner surface of said casing, each said cell being defined by said casing, said annular body and two said vanes adjacent each other.

17. A gas removable pump for liquid as claimed in claim 16, wherein said radial passage means opens into said cell at a position near one of said vanes of forward side in the rotational direction.

18. A gas removable pump for liquid as claimed in claim 16, wherein said radial passage means comprises a plurality of axially spaced orifices each having an opening to said cell, a groove formed in the face of said annular body and a radial extension of said removal passage in said drive shaft.

19. A gas removable pump for liquid as claimed in claim 18, wherein said housing includes fastened thereto a head cover for defining a discharge opening of said rotary pump and said outlet, and wherein said groove is closed by said head cover.

20. A gas removable pump for liquid as claimed in claim 19, wherein said valve body is disposed in said groove.

21. A gas removable pump for liquid as claimed in claim 14, wherein said valve body moving means comprises first and second chambers sealingly separated from each other, said first chamber being connected with said cell while said second chamber is maintained at a pressure substantially equal to a delivery pressure of said rotary pump.

22. A gas removable pump for liquid as claimed in claim 21, wherein said valve body moving means further comprises urge means for urging by a centrifugal force acting thereon said valve body toward a closed position thereof.

23. A gas removable pump for liquid as claimed in claim 22, wherein said urge means comprises a projection of said valve body separating said first and second chambers from each other.

24. A gas removable pump for liquid as claimed in claim 23, wherein said valve body comprises a cylindrical member and wherein said projection is formed on the circumferential surface of said valve body.

25. A gas removable pump for liquid as claimed in claim 23, wherein said valve body comprises a ball, said projection extending from the surface thereof.

26. A gas removable pump as claimed in claim 23, wherein said valve body is maintained in the open position by equilibrium between the centrifugal force acting on said projection and the pressure in said second chamber.

27. A gas removable pump for liquid as claimed in claim 26, wherein said valve body is in the open position during a suction phase of said cell.

28. A gas removable pump for liquid as claimed in claim 26, wherein said valve body is in the open position during a compression phase of said cell.

29. A gas removable pump for liquid as claimed in claim 26, wherein said valve body is in the open position during suction and compression phases of said cell.

* * * * *